United States Patent Office 3,543,153
Patented Nov. 24, 1970

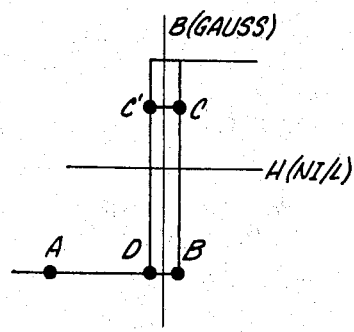
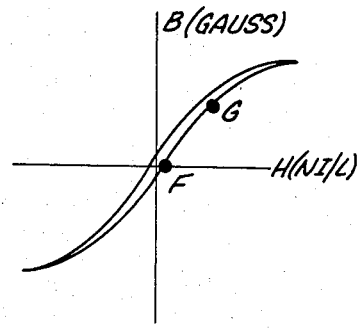
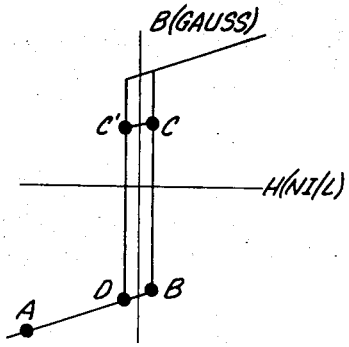
Fig. 3  Fig. 4  Fig. 5
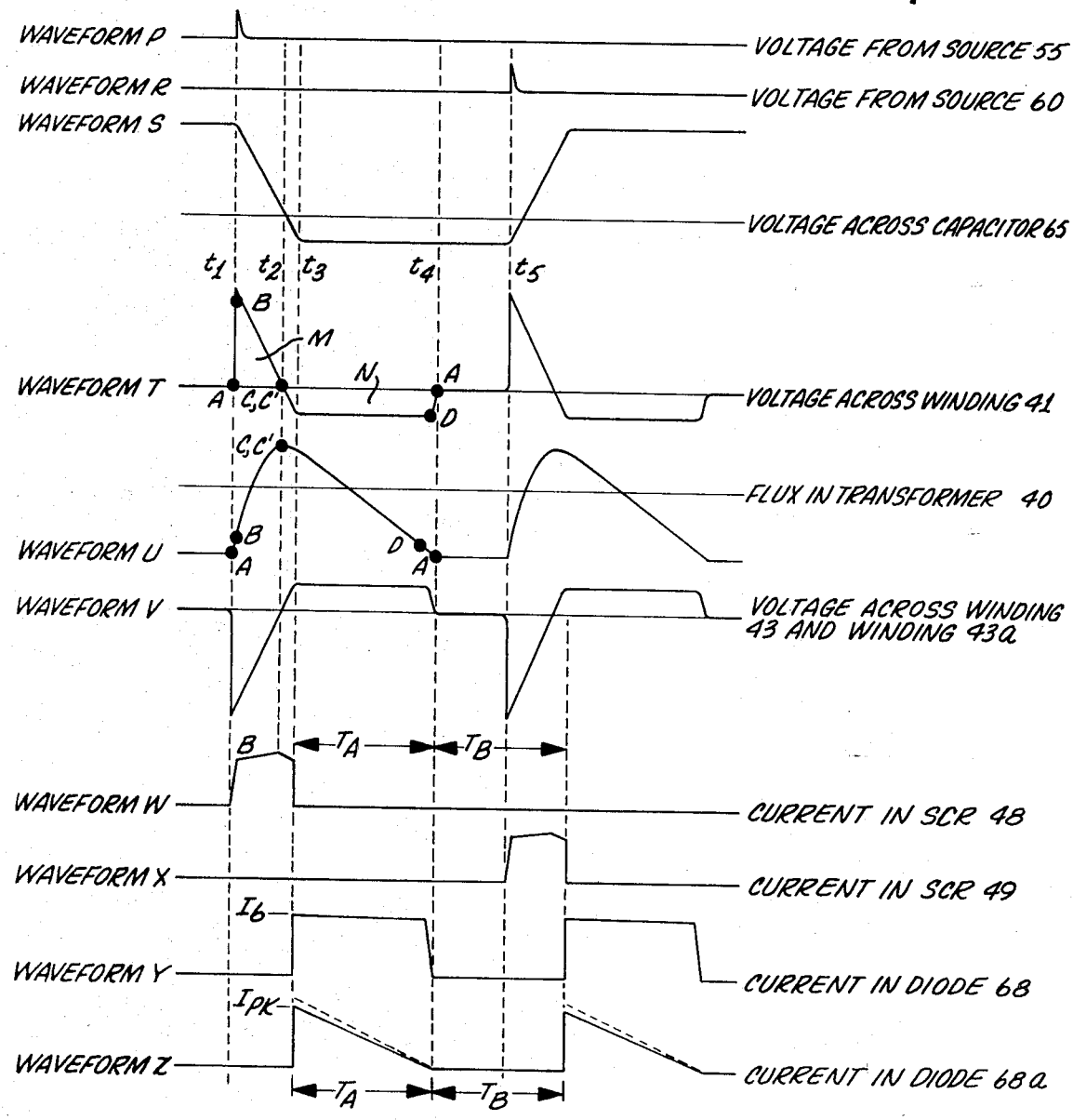
Fig. 6

3,543,153
CIRCUIT FOR MONITORING THE CURRENT
DELIVERED BY A SWITCHING REGULATOR
Luther L. Genuit, Scottsdale, Ariz., assignor to General
Electric Company, a corporation of New York
Filed Oct. 2, 1967, Ser. No. 672,187
Int. Cl. G01r 1/30, 19/00
U.S. Cl. 324—102                              4 Claims

ABSTRACT OF THE DISCLOSURE

A circuit for monitoring the current delivered by a switching regulator provides a signal for disabling the switching regulator when the current exceeds a predetermined value. This circuit also indicates the value of the current delivered by the switching regulator.

CROSS-REFERENCE TO RELATED APPLICATION

The switching regulator shown in the present application is disclosed in the United States patent application by Luther L. Genuit, filed Nov. 1, 1966, Ser. No. 591,204, now abandoned entitled Switching Regulator, which is assigned to the same assignee as the present invention.

BACKGROUND OF THE INVENTION

This invention relates to switching regulators and more particularly to circuits which monitor the current delivered by a switching regulator.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using discrete components when the two cabinets have the same physical size. In addition, high speed microcircuits usually use a much smaller value of D.C. voltage than circuits employing discrete components. For example, in many high speed microcircuits the required D.C. voltage may be less than 1 volt. This voltage must be well regulated to provide a constant value of D.C. for the microcircuits, otherwise variations in D.C. voltage may produce error signals in the data processing system.

The power supplied to any system is a product of the voltage and current so that a power distribution system must supply either a large value of current at a relatively small value of voltage or a smaller value of current at a relatively large value of voltage in order to provide a large amount of power. In prior art power supplies, power from a 220 volt A.C. line is converted into relatively small values of D.C. voltage and large amounts of current are distributed by large conductors or "bus" bars to various portions of the data processing system. The voltage drop in each bus bar is proportional to the amount of current in the bus bar so that the value of voltage supplied to each portion of the data processing system varies as current supplied to that portion varies. This variation in voltage may produce error signals in the data processing system.

Another disadvantage of the prior art power supplies is that the efficiency of the supplies is very low. These power supplies usually include a constant voltage transformer, a rectifier which converts the A.C. voltage to a D.C. voltage, and a series regulator which reduces the D.C. voltage to a small but constant value. In such a system the voltage drop in the constant voltage transformer, the rectifier and the series regulator is usually about 5–6 volts while the output voltage necessary for the microcircuits may be as low as 1 volt. This means that the power transformer must deliver approximately 6 to 7 times the power which is used by the microcircuits so that the overall efficiency of the power supply is less than 20 percent thereby causing the power supply to be bulky and expensive. Because of the large size, these power supplies are usually located in a separate cabinet and require long bus bars to distribute the current to other portions of the data processing system. These long bus bars cause severe variations in voltage when current in the bus bar varies. Still another disadvantage of the prior art power supplies is that an excessively large value of current drawn from the power supply can cause damage to the series regulator and other parts of the power supply. Also a short circuit in the series regulator may cause a large value of voltage to be supplied to the microcircuit modules. This large value of voltage can cause damage to the microcircuits.

A power supply system employing switching regulators and switching regulator control circuits alleviates the disadvantages of the prior art by converting an A.C. voltage to a relatively large value of unregulated D.C. voltage. This D.C. is distributed at a relatively large voltage but low current to various portions of the data processing system thereby allowing the use of relatively small conductors. A "standby" power supply comprising a plurality of batteries can be employed to supply the relatively large value of D.C. voltage in the event of the failure of the voltage on the A.C. line. This relatively large value of unregulated D.C. voltage can be converted to a relatively small value of D.C. voltage by switching regulators which are positioned at a plurality of locations in the data processing system. The switching regulator has an efficiency which is several times the efficiency of prior art power supplies employing series regulators thereby causing the physical size of the switching regulator to be relatively small and allowing the switching regulator to be positioned near the microcircuit modules.

The switching regulator may employ a transformer, a pair of silicon controlled rectifiers and a pair of signal sources to convert an unregulated D.C. voltage, such as 150 volts to an accurately regulated voltage, such as 1 volt. The silicon controlled rectifiers are employed as switches between the source of unregulated D.C. voltage and the transformer. The silicon controlled rectifiers are located on the "high" voltage side of the transformer where the current and the power losses in these rectifiers are low thereby causing the switching regulator to have a high degree of efficiency. The regulated D.C. voltage obtained from a secondary winding on a transformer is supplied to a pair of voltage output terminals. The transformer provides isolation between the regulated D.C. voltage and the source of unregulated D.C. voltage so that a short circuit in a silicon controlled rectifier will not cause damage to the microcircuit modules which provide the load on the switching regulator. The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and the cathode when the pulse of current flows from the gate, the silicon controlled rectifier "fires"; i.e., is rendered conductive and a current will flow from anode to the cathode. The rate at which current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the Silicon Controlled Rectifier Manual, third edition, 1964, published by the General Electric Company, Auburn, N.Y.

The pair of signal sources is coupled to the voltage output terminals and develops trigger signals whose frequency is determined by the value of voltage at the voltage output terminal. The trigger signals are coupled to the silicon controlled rectifiers in the switching regulator and cause these rectifiers to deliver energy through the transformer to the voltage output terminals. The signal sources sense any change in the value of regulated output voltage and cause a change in the frequency of the trigger signals delivered to the switching regulator. This change in frequency of the trigger signals causes a change in the "duty cycle" of the switching regulator. The duty cycle is the duration of time that energy is delivered to the voltage output terminals compared to the total duration of time between trigger signals. This change in the frequency of the trigger signals and in the duty cycle causes a change in the quantity of energy which the switching regulator delivers to the output terminals so that the voltage at the output terminals returns to the original value.

It is often desirable to monitor the current which a switching regulator delivers to a load. In some instances, it may be desirable to provide a signal which will disable the regulator when the current delivered exceeds a predetermined threshold value. A current meter or other current measuring device may be used to indicate the value of current as an aid in troubleshooting the electronic equipment to which the regulator is delivering current. Due to the low value of voltage delivered by the regulator conventional means for sensing current, such as an ammeter or a series resistor, becomes very inefficient due to the relatively large voltage drop across the sensing means. What is needed is a monitoring and current measuring circuit which does not change the value of the voltage delivered to a load.

It is therefore, an object of this invention to provide a new and improved circuit for monitoring the value of electrical current delivered by a switching regulator.

Another object of this invention is to provide a circuit for monitoring the value of electrical current delivered by a switching regulator that does not affect the value of the voltage delivered.

A further object of this invention is to provide a sim- sensing means. What is needed is a monitoring and current delivered by a switching regulator.

A still further object of this invention is to provide a simplified circuit for monitoring the value of electrical current delivered by a switching regulator and to deliver a signal which disables the regulator when the current exceeds a predetermined threshold value.

Another object of this invention is to provide a more efficient circuit for monitoring the value of electrical current delivered by a switching regulator.

SUMMARY OF THE INVENTION

The foregoing objects are achieved in the instant invention by providing a new and improved circuit for monitoring the current delivered by a switching regulator without decreasing the value of the voltage delivered to a load.

The switching regulator delivers a predetermined quantity of electrical energy to an output filter for each time a silicon controlled rectifier in the regulator fires. Each time a silicon controlled rectifier fires a pulse of voltage develops across a secondary winding of the transformer in the regulator. The instant invention senses the value of current delivered to the output filter capacitor by sensing the duty cycle of the voltage pulses across the secondary winding of the transformer.

Other objects and advantages of this invention will become apparent from the following description when taken in connection with the accompanying drawings.

BRIEF DESCRIPTION OF THE DRAWINGS

FIGS. 3, 4 and 5 illustrate magnetization curves which are useful in explaining the operation of the circuit shown in FIG. 1;

FIG. 6 illustrates waveforms which are useful in explaining the operation of the circuit shown in FIGS. 1 and 2.

DESCRIPTION OF THE PREFERRED EMBODIMENT

Figure 1:
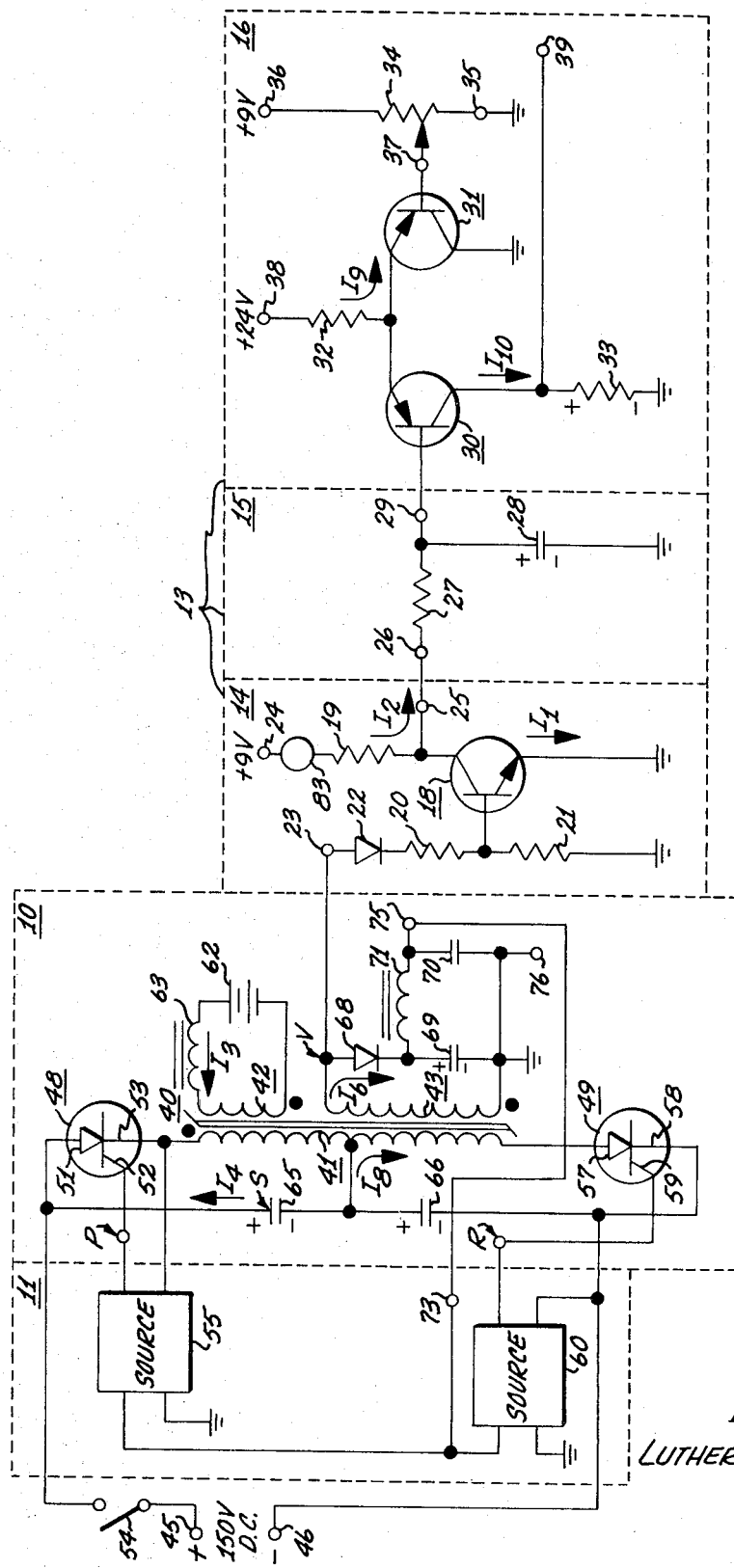
FIG. 1 is a schematic drawing of an embodiment of the instant invention.

Referring more particularly to the drawings by the characters of reference, FIG. 1 discloses a power supply system which is designed to provide a constant value of D.C. output voltage for a wide range of values of output current and for monitoring the current delivered to a load which may be connected to the system. As indicated in FIG. 1, the system comprises a switching regulator 10, a switching regulator control circuit 11 for providing trigger signals to switching regulator 10 and a circuit 13 for monitoring the current delivered by the power supply. The circuit 13 for monitoring the current delivered by the power supply comprises a detector 14, an integrator 15 and a comparator 16. The detector 14 senses the delivery of current by the switching regulator and develops a signal voltage whose value is determined by the amount of current delivered. When regulator 10 is not delivering current, the voltage from regulator 10 causes a transistor 18 in detector 14 to be nonconductive so that a capacitor 28 charges to the polarity shown in FIG. 1. When regulator 10 is delivering current, a positive voltage appears at a signal input terminal 23 of detector 14 thereby causing transistor 18 to be rendered conductive so that capacitor 28 partially discharges through transistor 18. The voltage across capacitor 28 is determined by the duration of time that transistor 18 is nonconductive and the duration of time that transistor 18 is conductive. These times are determined by the duty cycle of the switching regulator. The voltage across capacitor 28 controls the flow of current through transistor 30 in comparator 16 and determines the voltage across resistor 33 in comparator 16. When the voltage across capacitor 28 and on the base of transistor 30 exceeds a predetermined threshold value transistor 30 is nonconductive. When the voltage on the base of transistor 30 drops below this threshold value, transistor 30 is rendered conductive so that current flows through resistor 33 and produces a voltage drop across resistor 33.

SWITCHING REGULATOR

As indicated in FIG. 1, switching regulator 10 includes a transformer 40 comprising a primary winding 41 having a center tap and a pair of secondary windings 42 and 43. The primary winding is coupled to a high voltage D.C. power supply having a positive output terminal 45 and a negative output terminal 46. A pair of silicon controlled rectifiers 48 and 49 control the current supplied by the power supply to the primary winding of transformer 40. An anode 51 of silicon controlled rectifier 48 is connected through a switch 54 to the positive terminal 45 of the high voltage power supply and the cathode 53 of silicon controlled rectifier 48 is connected to the upper end of primary winding 41. Gate 52 of the silicon controlled rectifier 48 and cathode 53 are connected to a first signal source 55 which provides trigger signals to render rectifier 48 conductive. The anode 57 of silicon controlled rectifier 49 is connected to the lower end of primary winding 41 and cathode 58 of silicon controlled rectifier 49 is connected to the negative terminal 46 of the high voltage power supply. A second signal source 60 is connected between gate 59 and cathode 58 of silicon controlled rectifier 49 to provide trigger signals to render rectifier 49 conductive.

A saturable core employed in transformer 40 produces the magnetization characteristics illustrated in the magnetization curve of FIG. 3. The magnetizing force H is equal to the product of the number of turns of wire in a winding on the transformer core and the number of amperes of current for each turn of wire divided by the length of the core.

Since the physical length of a particular transformer core is constant, the magnetizing force of a transformer is often expressed as the number of amperes times the number of turns or "ampere-turns." The flux density B is the number of lines of flux per square centimeter of the transformer core and is determined by the value of the magnetizing force and the type of material used in the core. A discussion of the magnetization curves can be found in the textbook "Magnetic Circuits and Transformers" by EE Staff, M.I.T., 1943, published by John Wiley & Sons, New York, N.Y.

A transformer having only a saturable core can be used in the circuits shown in FIG. 1, but the low value of inductance in the saturated portion of the magnetization curve between points A and B of FIG. 3 causes the generation of electrical noise in the filter circuit. This noise can produce error signals in the data processing system which may be connected to the filter circuit. The horizontal portion of the magnetization curve between points A and B causes the current in the primary winding 41 to increase very rapidly when silicon controlled rectifier 48 or silicon controlled rectifier 49 is rendered conductive. This rapid increase in current generates electrical noise and may also cause damage to the silicon controlled rectifiers. This amount of noise generated can be greatly reduced and the rate of increase of current in primary winding 41 can be reduced by using a transformer 40 having a saturable core and a linear core placed side by side with the primary winding extending completely about both cores. A linear core employed in a transformer produces the magnetization characteristics illustrated in the magnetization curve of FIG. 4. The magnetization curve for the combination of a saturable and a linear core is shown in FIG. 5. This magnetization curve of FIG. 5 is similar to the magnetization curve of FIG. 3 except that between points A and B the curve has an appreciable amount of slope instead of being almost horizontal as shown in the curve of FIG. 3.

A bias power supply 62 provides a current through an inductor 63 and a bias secondary winding 42. Power supply 62 and secondary winding 42 are selected to provide a magnetizing force so that the saturable core is saturated and operating at point A of FIG. 5 when there is no current in the primary winding 41 of transformer 40.

The operation of the circuit of FIG. 1 will now be discussed in connection with the magnetization curve shown in FIG. 5 and waveforms shown in FIG. 6.

A pair of capacitors 65 and 66 provide predetermined quantities of electrical energy to the transformer 40 each time one of the silicon controlled rectifiers 48 and 49 is rendered conductive. Each time one of the silicon controlled rectifiers 48 and 49 is rendered nonconductive this same predetermined quantity of energy is delivered by the transformer 40 through a diode 68 to a filter capacitor 69. Prior to time $t_1$ shown in FIG. 6, capacitor 65 of FIG. 1 is charged to the polarity shown in FIG. 1. At time $t_1$ a pulse from signal source 55 renders silicon controlled rectifier 48 conductive so that the voltage across capacitor 65 is applied to the upper half of primary winding 41 causing a current $I_4$ to flow from the upper plate of capacitor 65 to anode 51, through cathode 53 and the upper half of primary winding 41 to the lower plate of capacitor 65. Current $I_4$ through primary winding 41 causes a change in flux in the transformer core and causes the operating point to move from point A toward point B of the magnetization curve in FIG. 5. This change in flux produces a voltage across primary winding 41 which limits the rate of increase in current through silicon controlled rectifier 48 thereby preventing possible damage to rectifier 48. The operating point reaches point B when the ampere-turns in the primary winding 41 are approximately equal to the ampere-turns in the bias secondary winding 42. A positive voltage applied to the upper end of the primary winding 41 causes the operating point to move upwards from point B toward point C. The distance between point B and point C is proportional to the product of the voltage applied to primary winding 41 and the duration of time this voltage is applied. The substantially vertical slope of the curve between point B and point C shows that there is substantially no change in the current in the primary winding 41 as the operating point moves from point B to point C.

The voltage applied to the upper half of the primary winding 41 is magnetically coupled through the transformer core to the secondary windings 42 and 43. Between time $t_1$ and time $t_2$ secondary windings 42 and 43 each have a positive polarity of voltage at the lower end of the winding and a negative polarity of voltage at the upper end of the winding. This voltage across secondary winding 42 causes the current $I_3$ in inductor 63 to increase thereby storing energy in inductor 63. At the same time, the voltage across secondary winding 43 causes diodes 68 and 22 to be back biased so that no current flows through these diodes or through secondary winding 43. Capacitor 65 provides current $I_4$ until this capacitor has discharged at time $t_2$ as shown in waveform S of FIG. 6. The area M under the curve of waveform T (FIG. 6) between time $t_1$ and time $t_2$ is a sum of the products of the voltage applied to primary winding 41 and the durtaion of time the voltage is applied and this area M represents the total energy stored in inductor 63. When the voltage applied to primary winding 41 has a 0 value at time $t_2$, the operating point reaches point C.

At time $t_2$, the energy stored in inductor 63 provides a current through transformer winding 42 which returns energy to the transformer and reverses the polarity of voltage across each of the transformer windings so that a negative polarity of voltage is developed at the upper end of primary winding 41. This negative polarity of voltage at the upper end of primary winding 41 causes the operating point in FIG. 4 to move from point C to point C' and to begin moving toward point D. Again the distance between point C' and point D is proportional to the product of the voltage across primary winding 41 and the duration of time this voltage is applied. The area N under the curve of waveform T between times $t_2$ and $t_4$ is the sum of the products of the voltage across primary winding 41 and the time the voltage is applied and this area N represents the total energy which inductor 63 returns through the transformer. The voltage across primary winding 41 causes current $I_4$ to charge capacitor 65 to a polarity opposite to the polarity shown in FIG. 1.

As energy from inductor 63 is returned to the transformer, the voltage across secondary winding 43 increases to a value larger than the voltage across filter capacitor 69 so that a current $I_6$ flows through diode 68 to charge capacitor 69. The substantially vertical magnetization curve between points C' and D in FIG. 5 causes the value of current $I_6$ to be substantially constant between time $t_3$ and time $t_4$ as shown in waveform of FIG. 6. The value of capacitor 69 is several times as large as the value of capacitor 65 so current $I_6$ causes very little change in the value of voltage across capacitor 69. The currents in windings 41 and 43 are proportional to the relative values of capacitance across each of these windings. The relatively large value of capacitor 69 causes current $I_6$ in winding 43 to be several times as large as the current $I_4$ in primary winding 41 so that current $I_4$ decreases below the holding current necessary to cause silicon controlled rectifier 48 to be conductive. Rectifier 48 is rendered nonconductive and the energy stored in the inductor 63 is returned through the transformer to capacitors 69 and 70. When all the currents in the transformer windings except secondary winding 42 decreases to a zero value, the operating point of the magnetization curve moves from point D back to point A.

The energy which is stored in the inductor when silicon controlled rectifier 48 conducts is proportional to the difference between the flux at point A and point C on the magnetization curve of FIG. 5; and the energy which is transferred from the inductor to the transformer to the filter capacitor when silicon controlled rectifier 48 is rendered nonconductive, is proportional to the difference between the flux at point C' and point A.

Since the distance between points A and C along the curve shown in FIG. 5 is substantially the same as the distance between points C' and A, substantially all the energy which was stored in inductor 63 between times $t_1$ and $t_2$ is returned through the transformer between times $t_3$ and $t_4$ and is stored in capacitors 69 and 70. Capacitor 65 delivers substantially the same amount of energy to the transformer each time the silicon controlled rectifier 48 is rendered conductive so that the amount of energy delivered to filter capacitors 69 and 70 and the voltage across these capacitors are determined by the frequency of the signals applied to gate 52 of rectifier 48.

Capacitor 66 also provides a predetermined quantity of energy to the transformer each time silicon controlled rectifier 49 is rendered conductive. Prior to time $t_5$ capacitor 66 is charged to the polarity shown in FIG. 1. At time $t_5$ a pulse from signal source 60 renders silicon controlled rectifier 49 conductive so that a curent $I_8$ flows from the upper plate of capacitor 66 through the lower half of primary winding 41, anode 57 and cathode 58 to the lower plate of capacitor 66. Current $I_8$ through the lower half of primary winding 41 and the voltages impressed across this winding cause the operating point of the characteristic curve in FIG. 5 to move from point A to point C and causes an increase in current $I_3$ to store a predetermined quantity of energy in inductor 63. When silicon controlled rectifier 49 is rendered nonconductive, this energy is returned through the transformer 40, and a current $I_6$ charges capacitor 69 as described above.

The amount of voltage across capacitors 69 and 70 can be controlled by controlling the frequency of the trigger signals which signal sources 55 and 60 apply to the gates of silicon controlled rectifiers 48 and 49. The frequency of the trigger signals is determined by the value of the voltage applied to the control terminal 73. When an increase in the amount of current drawn by a load (not shown) connected across the output terminals 75 and 76 in FIG. 1 causes the value of the voltage at control terminal 73 to fall below a predetermined reference level, the frequency of the output signals from the signal sources 55 and 60 increases. This increase in the frequency of the output signals causes an increase in the rate of energy delivered to the filter capacitors 69 and 70 and increases the voltage at control terminal 73 to the predetermined reference level. The voltage at output terminal 75 of the power supply controls the frequency of the signals from signal sources 55 and 60 so that the voltage at the output terminals 75 and 76 is substantially constant even when the current drawn from this power supply varies over a wide range of values.

CURRENT MONITORING CIRCUIT

As indicated in FIG. 1, the circuit 13 for monitoring the current delivered by switching regulator 10 comprises a detector 14, an integrator 15 and a comparator 16. Detector 14 includes a transistor 18 having a control electrode or base, a first output electrode or collector and a second output electrode or emitter. The collector of transistor 18 is connected through a resistor 19 and a current measuring device or meter 83 to a first reference potential, such as +9 volts. The emitter of transistor 18 is connected to a second reference potential, such as ground, so that transistor 18 is rendered nonconductive in the absence of a positive signal voltage applied to the base of the transistor. The base of transistor 18 is connected to a voltage divider including resistors 20 and 21. A diode 22 connected between an input terminal 23 and resistor 20 prevents a negative voltage at input terminal 23 from causing damage to transistor 18.

The output terminal 25 of detector 14 is connected to an input terminal 26 of integrator 15. Integrator 15 includes a resistor 27 and a capacitor 28. An output terminal 29 of integrator 15 is connected to the junction point between resistor 27 and capacitor 28 and is also connected to the control electrode or base of a transistor 30 in comparator 16. Comparator 16 comprises a pair of transistors 30 and 31 arranged to compare the voltage across capacitor 28 with a reference voltage applied to the control electrode or base of transistor 31. The emitters of transistors 30 and 31 are coupled to a third reference potential such as +24 volts by a resistor 32. The collector of transistor 31 is connected directly to ground and the collector of transistor 30 is connected to ground by a resistor 33. A voltage divider comprising a potentiometer 34 having a pair of input terminals 35 and 36 and an output terminal 37 provides a reference voltage to the base of transistor 31. When the voltage at the base of transistor 30 is less positive than the voltage at the base of transistor 31, transistor 30 is rendered conductive and transistor 31 is nonconductive. When transistor 30 is conductive, current flows from terminal 38 through resistor 32, through emitter to collector of transistor 30, through resistor 33 to ground thereby providing a voltage drop of the polarity shown across resistors 33. The voltage drop across resistor 33 provides a voltage at output terminal 39. When the voltage at the base of transistor 30 is more positive than the voltage at the base of transistor 31, transistor 30 is rendered nonconductive and transistor 31 is rendered conductive. When transistor 30 is nonconductive, there is no voltage drop across resistor 33 and no voltage at output terminal 39.

The operation of the circuit 13 for monitoring the current delivered by switching regulator 10 will now be discussed in connection with the circuit shown in FIG. 1 and the waveforms shown in FIG. 6.

During time $T_A$ shown in waveform V of FIG. 6, a positive voltage at the upper end of secondary winding 43 of transformer 40 causes a current $I_6$ to flow through diode 68 to the upper plate of capacitor 69. The value of current $I_6$ is determined by the value of bias current $I_3$ flowing in secondary winding 42 and by the characteristics of transformer 40 and is not affected by the load (not shown) across output terminals 75 and 76 or by the value of D.C. voltage applied to terminals 45 and 46. The value of current $I_6$ is substantially constant during the time diode 68 conducts as shown in waveform Y of FIG. 6. The duty cycle of the regulator and average value of current are determined by the load across output terminals 75 and 76. The average value of this current, $$I_{av} = I_6 \frac{T_A}{T_A + T_B}$$

and duty cycle $= \frac{T_A}{T_A + T_B}$ where $I_6$ is the value of the current when diode 68 conducts, $T_A$ is the duration of time the diode 68 conducts and $T_B$ is the duration of time diode 68 is nonconductive.

The positive voltage at the upper end of secondary winding 43 during time $T_A$, is coupled to the base of transistor 18 in detector 14 by diode 22 and resistor 20. The positive voltage at the base of transistor 18 renders transistor 18 conductive so that a current $I_1$ flows from the upper plate of capacitor 28, through resistor 27, from the collector to the emitter of transistor 18 to ground. Current $I_1$ reduces the value of voltage across capacitor 28. During time $T_B$ the voltage at the upper end of secondary winding 43 causes diode 22 to be back biased so that diode 22 is nonconductive. The voltage at the base of transistor 18 is approximately at ground potential so that transistor 18 is rendered nonconductive. When transistor 18 is nonconductive, a current $I_2$ flows from terminal 24, through meter 83 and resistors 19 and 27 to the upper plate of capacitor 28, from the lower plate of capacitor 28 to ground, thereby charging capacitor 28 to the polarity shown in FIG. 1. The average value of current $I_2$, through meter 83 is determined by the duration of time $T_A$ and the duration of time $T_B$. The voltage across capacitor 28 is determined by the duration of time $T_A$ and the duration of time $T_B$, and the current delivered to output capacitor 69 in switching regulator 10 is also determined by the duration of time $T_A$ and time $T_B$.

The current delivered by the switching regulator 10 is determined by the value of a load connected between output terminals 75 and 76. When a small load is connected to output terminals 75 and 76, a small value of current is delivered to output capacitor 69 in regulator 10 so that the duration of time $T_B$ is very long compared to the duration of time $T_A$ (FIG. 6). During time $T_B$ the transistor 18 in detector 14 is nonconductive so that capacitor 28 charges substantially to the +9 volts at terminal 24 in detector 14. The +9 volts across capacitor 28 is applied to the base of transistor 30 in comparator 16 causing transistor 30 to be rendered nonconductive. Potentiometer 34 is adjusted so that the value of voltage at the base of transistor 31 is substantially less than the +9 voltage at the base of transistor 30. The voltage at the base of transistor 31 renders transistor 31 conductive so that a current $I_9$ flows from terminal 38 through resistor 32, through emitter to collector of transistor 31 to ground. No current flows through transistor 30 or resistor 33 and the voltage at terminal 39 is approximately at ground potential.

When the load (not shown) between output terminals 75 and 76 in regulator 10 increases, the repetition rate of the current pulses delivered to filter capacitor 69 increases and the duration of time $T_B$, when current is not delivered to capacitor 69, decreases. This increases the duty cycle of regulator 10 and of transistor 18. When transistor 18 is conductive, the capacitor 28 partially discharges, reducing the voltage across the capacitor 28. When the duty cycle, $$\frac{T_A}{(T_A+T_B)}$$

increases to a predetermined value, which is determined by the setting of potentiometer 34, the value of the voltage at the base of transistor 30 is less than the value of the voltage at the base of transistor 31. Transistor 30 is rendered conductive so that a current $I_{10}$ flows from terminal 38 through resistor 32, from the emitter to the collector of transistor 30, through resistor 33 to ground. Current $I_{10}$ through resistor 33 provides a voltage drop of the polarity shown across resistor 33 and provides a positive voltage at terminal 39. The voltage at terminal 39 can be used to operate a warning device which indicates that an excessively large amount of current is being delivered by switching regulator 10 or the voltage at terminal 39 can be used to energize a relay (not shown) which opens switch 54 and disables switching regulator 10. The voltage at terminal 39 can also be used to disable signal sources 55 and 60 thereby causing the regulator output to be reduced to zero.

Figure 2:
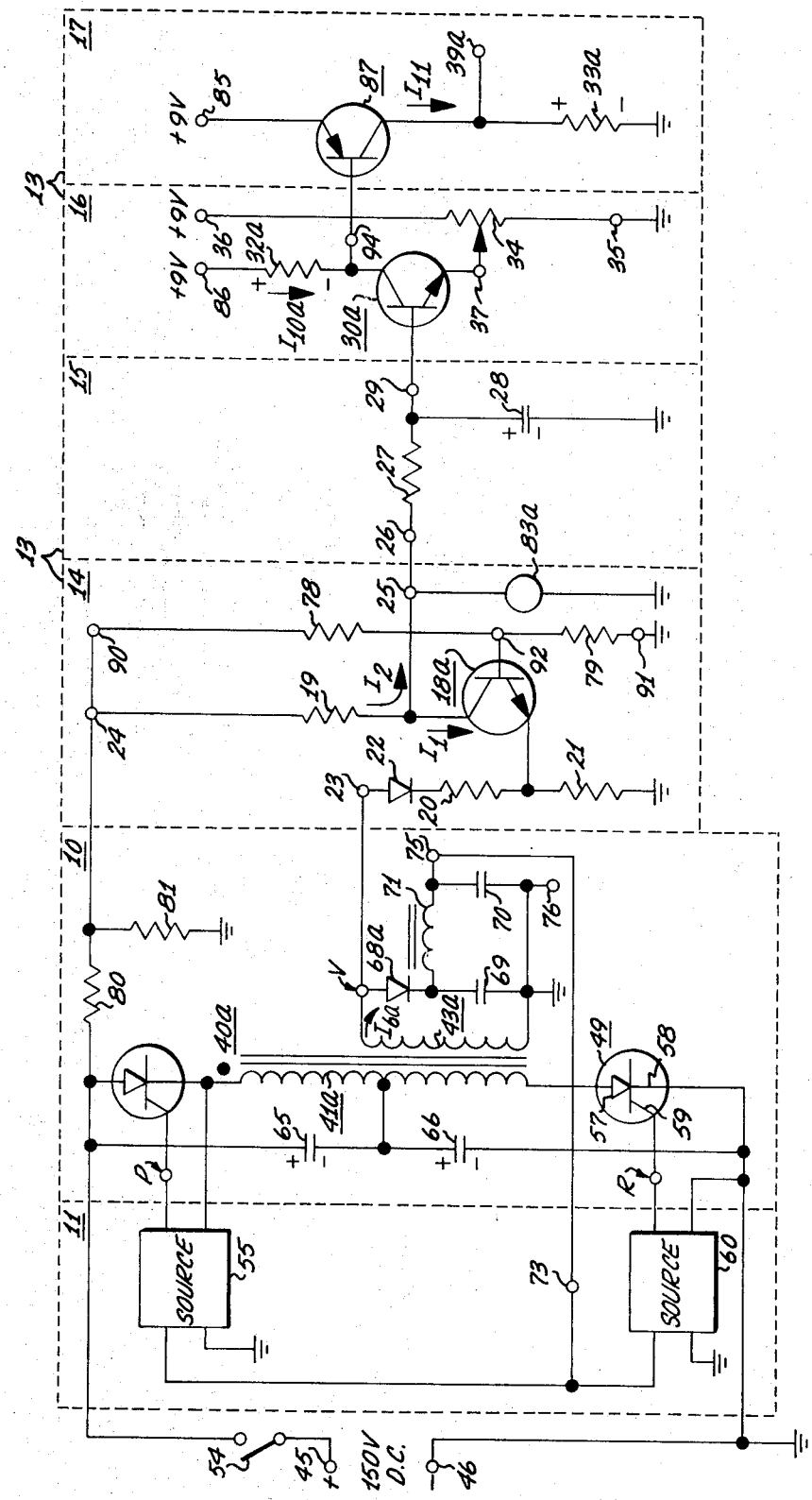
FIG. 2 is another embodiment of the instant invention.

FIG. 2 illustrates a second embodiment of the invention shown in FIG. 1 wherein like parts have similar reference characters. The circuit in FIG. 2 differs from the circuit of FIG. 1 in that the meter 83 which is connected between the +9 volt potential and the collector of transistor 18 in FIG. 1 has been replaced by a meter 83a connected between the collector of transistor 18a and ground. The emitter of transistor 18a is connected to the voltage divider including resistors 20 and 21. The base of transistor is connected to a second voltage divider including resistors 78 and 79. The pair of transistors 30 and 31 used in comparator 16 of FIG. 1 has been replaced by a single transistor 30a and an output stage 17 including a transistor 87 has been added to change the signal from transistor 30a to a desired voltage level. The circuit of FIG. 2 also differs from the circuit of FIG. 1 in that it employs a transformer 40a having only a linear core and does not employ a separate inductor to store energy. The energy from capacitors 64 and 66 which was stored in inductor 63 in the circuit of FIG. 1 is stored in the linear core of transformer 40a shown in FIG. 2. When a pulse from source 55 causes silicon controlled rectifier 48 to be rendered conductive current $I_4$ through the upper half of primary winding 41 causes energy to be stored in the linear core of transformer 40a. When current no longer flows in primary winding 41, the energy stored in the linear core is returned to the windings causing a positive voltage to develop at the upper end of secondary winding 43a. The voltage across winding 43a causes current to flow so that a charge is stored on capacitors 69 and 70 in the manner described above.

The voltage divider comprising resistors 78 and 79 provides a positive bias voltage at the base of transistor 18a which causes the transistor to be rendered conductive in the absence of a positive signal voltage applied to the emitter of transistor 18a. At time $T_B$ the positive voltage on the base causes transistor 18a to be conductive so that current $I_1$ flows from the upper plate of capacitor 28, through resistor 27, from collector to emitter of transistor 18a, through resistor 21 to ground thereby decreasing the voltage across capacitor 28. At time $T_A$ the positive voltage developed at the upper end of secondary winding 43a is coupled to the emitter of transistor 18a by diode 22 and resistor 20. The positive voltage at the emitter of transistor 18a renders transistor 18a nonconductive so that a current $I_2$ flows from terminal 24 through resistors 19 and 27 to the upper plate of capacitor 28, from the lower plate of capacitor 28 to ground, thereby increasing the voltage across capacitor 28. The ratio of $$\frac{T_A}{T_A+T_B}$$

determines the voltage across capacitor 28 and determines the voltage across meter 83. Meter 83 can be calibrated to read the value of current which regulator 10 delivers to filter capacitors 69 and 70.

Comparator 16 compares the voltage across capacitor 28 with a reference voltage from output terminal 37 of the potentiometer 34. When no current is delivered to output capacitor 69 by regulator 10, the ratio of $$\frac{T_A}{T_A+T_B}$$

(FIG. 6) is equal to zero. The transistor 18a in detector 14 is conductive so that capacitor 28 discharges through transistor 18a. The value of voltage at terminal 37 of the potentiometer 34 and at the emitter of transistor 30a is more positive than the value of voltage at the base of transistor 30a thereby causing transistor 30a to be nonconductive. No current flows through transistor 30a or resistor 32a so that the voltage at the base of transistor 87 in the output stage 17 is approximately +9 volts. Transistor 87 is rendered nonconductive so that the voltage at terminal 39 is approximately at ground potential.

When the value of current delivered to output capacitor 69 increases, the ratio $$\frac{T_A}{T_A+T_B}$$

increases, transistor 18a is rendered nonconductive for a greater portion of the time and the voltage across capacitor 28 increases. When the value of the voltage across capacitor 28 increases to a value which is more positive than the value of voltage at the emitter of transistor 30a, transistor 30a is rendered conductive. When transistor 30a is conductive, a current $I_{10a}$ flows from terminal 86 through resistor 32a to the collector of transistor 30a, through collector to emitter of transistor 30a and through the lower portion of potentiometer 34 to ground. Current $I_{10a}$ provides a voltage drop of the polarity shown across resistor 32a and decreases the voltage at output terminal 94 of comparator 16. The voltage drop across resistor 32a subtracts from the voltage at terminal 86 so that the voltage at the base of transistor 87 in the ouput stage 17 is less than the voltage at the emitter of transistor 87. Transistor 87 is rendered conductive so that a current $I_{11}$ flows from terminal 85 through emitter to collector of transistor 87 through resistor 33a to ground. Current $I_{11}$ provides a voltage drop of the polarity shown across resistor 33a and provides a voltage at output terminal 39a. The voltage at output terminal 39a can be used to operate a warning device or to disable the switching regulator as discussed above. The voltage at output terminal 94 of comparator 16 may also be used to operate a warning device.

The characteristic curve for a linear core of a transformer is shown in FIG. 4. This smooth characteristic curve causes the inductance of the windings in transformer 40a to be relatively constant over the portion of the curve from point F to point G. When a relatively large capacitor 69 is employed as the output filter capacitor, the voltage across capacitor 69 is substantially constant as discussed above. This causes the current $I_{6a}$ in diode 68a to have a linearly decreasing value as shown in waveform Z of FIG. 6. The change in current in diode 68a, $$\frac{di}{dt}=\frac{E}{L}$$

where $di/dt$ is the rate of change of current in diode 68a, L is the inductance of the secondary winding 43a and E is the essentially constant voltage across capacitor 69. When L has a constant value and E has a constant value, $di/dt$ is constant so that current $I_{6a}$ starts at a peak value $I_{pk}$ and decreases at a constant or linear rate. The average value of this current, $$I_{av}=\tfrac{1}{2}I_{pk}\frac{T_A}{T_A+T_B}$$

The voltage waveform across secondary winding 43a in FIG. 2 is substantially the same as the voltage waveform across winding 43 in FIG. 1. This voltage is illustrated in waveform V of FIG. 6. The current waveform in diode 68a of FIG. 2 is shown in waveform Z of FIG. 6 and the current waveform in diode 68 of FIG. 1 is shown in waveform Y of FIG. 6. Thus, it can be seen that when the circuit 14 having a meter 83 is used with a transformer 40a having a linear core the meter must be calibrated differently than when circuit 14 is used with a transformer having a saturable core.

When switching regulator 10 employs a transformer having a linear core, an increase in the voltage at terminal 45 of the high voltage power supply causes an increase in the peak current, $I_{pk}$ through diode 68a as shown by the dashed lines in waveform Z of FIG. 6. A voltage divider including resistors 80 and 81 provides a corresponding increase in the voltage at terminal 24 in detector 14 so that current $I_2$ through resistor 19 also increases a corresponding amount to increase the voltage across capacitor 28 and improve the accuracy of the meter reading.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:
1. A circuit for monitoring the current delivered by a switching regulator including a transformer having a primary winding and a secondary winding, said circuit comprising: first and second transistors each having a control electrode and first and second output electrodes; means for coupling said second output electrode of said first transistor to said secondary winding to sense the flow of current delivered by said regulator, said secondary winding providing a signal to said second output electrode of said first transistor when current is delivered by said regulator; bias means for rendering said first transistor conductive when no current is delivered by said regulator, said bias means being coupled to said control electrode of said first transistor, said signal from said secondary winding rendering said first transistor nonconductive when current is delivered by said regulator; an integrator, said integrator being connected between said first output electrode of said first transistor and said control electrode of said second transistor; first, second and third reference potentials; resistance means for connecting said first output electrode of said second transistor to said first potential; a voltage divider having first and second input terminals and an output terminal, said first and said second input terminals of said divider being connected to said first and said second potentials respectively, said output terminal of said divider being coupled to said second output electrode of said second transistor; resistive means for connecting said first output electrode of said first transistor to said third potential; and an output terminal, said output terminal being connected to said first output electrode of said second transistor.

2. A circuit for monitoring the current delivered by a switching regulator as defined in claim 1 wherein: a source of D.C. voltage is connected to said switching regulator to provide power to said regulator, said source of D.C. voltage being connected to provide said third reference potential so that the value of said third potential changes as the value of said D.C. voltage at said source changes.

3. A circuit for monitoring the current delivered by a switching regulator as defined in claim 1 including a current measuring device, said device being connected between said second reference potential and said first output electrode of said first transistor.

4. A circuit for monitoring the current delivered by a switching regulator as defined in claim 1 including a current measuring device, said device being connected between said second reference potential and said first output electrode of said first transistor and wherein: a source of D.C. voltage is connected to said switching regulator to provide power to said regulator, said source of D.C. voltage being connected to provide said third reference potential so that the value of said third potential is determined by the value of D.C. voltage at said source.

(References on following page)

References Cited

UNITED STATES PATENTS

| | | | |
|---|---|---|---|
| 3,164,754 | 1/1965 | Garland et al. | 317—148.5 |
| 3,418,528 | 12/1968 | Watanabe et al. | 317—148.5 XR |
| 3,465,248 | 9/1969 | Thiele | 324—111 XR |
| 3,113,260 | 12/1963 | Wiley | 317—33 XR |
| 3,181,008 | 4/1965 | Huckins | 307—235 |
| 3,241,001 | 3/1966 | Gutow et al. | 317—33 XR |
| 3,262,015 | 7/1966 | McNamee et al. | 317—33 XR |
| 3,345,562 | 10/1967 | Rockwell | 324—119 |
| 3,428,897 | 2/1969 | Rew et al. | 324—119 XR |

FOREIGN PATENTS

| | | |
|---|---|---|
| 1,010,498 | 11/1965 | Great Britain. |
| 1,102,274 | 3/1961 | Germany. |

RUDOLPH V. ROLINEC, Primary Examiner

E. F. KARLSEN, Assistant Examiner

U.S. Cl. X.R.

317—33; 324—119, 123